United States Patent

Chang

[15] 3,679,708
[45] July 25, 1972

[54] PEROXIDES BEARING GAMMA-LACTONE RING AND METHOD OF MAKING THE SAME

[72] Inventor: Yun Ger Chang, Austin, Tex.
[73] Assignee: Reichhold Chemicals, Inc., White Plains
[22] Filed: March 9, 1971
[21] Appl. No.: 122,549

[52] U.S. Cl. ..........................260/343.6, 260/89.1, 260/89.5, 260/92.8, 260/93.5, 260/93.7, 260/94.9
[51] Int. Cl. ..............................................C07d 5/06
[58] Field of Search................................260/343.6

[56] References Cited

UNITED STATES PATENTS 3,590,080  6/1971  Beesley et al. ................260/343.6

Primary Examiner—Alex Mazel
Assistant Examiner—Anne Marie T. Tighe
Attorney—Munson H. Lane and Munson H. Lane, Jr.

[57] ABSTRACT

New peroxides containing the gamma-lactone ring are prepared by reacting alpha-acetyl-gamma-butyrolactone or alpha-acetyl-alpha-methyl-gamma-butyrolactone with a monofunctional hydroperoxide in the presence of an acidic catalyst at a temperature ranging from about −10° C. to about 100° C. with a preferred temperature of from about 10° C. to about 30° C. The mole ratio of the reactants may vary from about 1:2 to about 1:4 and the preferred mole ratio may range from about 1:2.0 to about 1:2.2. Peroxides of this invention are highly efficient polymerization initiators and crosslinking agents.

6 Claims, No Drawings

PEROXIDES BEARING GAMMA-LACTONE RING AND METHOD OF MAKING THE SAME

This invention relates to some novel peroxides and methods of making them. Particularly, this invention relates to peroxides obtained by reacting alpha-acetyl-gamma-lactones with monohydroperoxides. More particularly, the present invention is directed to peroxides derived from alpha-acetyl-gamma-butyrolactone and alpha-acetyl-alpha-methyl-gamma-butyrolactone reacted with monohydroperoxides.

Still more particularly the invention relates to the preparation of new peroxides containing the gamma-lactone ring prepared by reacting alpha-acetyl-gamma-butyrolactone or alpha-acetyl-alpha-methyl-gamma-butyrolactone with a monofunctional hydroperoxide in the presence of an acidic catalyst at a temperature ranging from about −10° C. to about 100° C. with a preferred temperature of from about 10° C. to about 30° C. The mole ratio of the reactants may vary from about 1:2 to about 1:4 and the preferred mole ratio may range from about 1:2.0 to about 1:2.2. Peroxides of this invention are highly efficient polymerization initiators and cross-linking agents.

These novel peroxides are the perketals bearing a five-membered heterocyclic gamma-lactone ring. They may be represented by the following general formula.

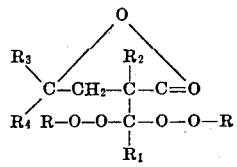

wherein R is alkyl, cycloalkyl, alkcycloalkyl, aralkyl, arcycloalkyl, a cycloalkyl or an alkcycloalkyl condensed or fused with an aromatic ring, or the corresponding substituted moiety bearing one or more substituents, such as halogen atoms, alkyl, carboxy, nitro, hydroxy groups; $R_1$, $R_2$, $R_3$ and $R_4$ may be the same or different members of the group consisting of hydrogen atom, alkyl substituted alkyl, cycloalkyl, alkcycloalkyl, aralkyl, arcycloalkyl.

Lactones containing a five-or six-membered heretocyclic ring appear to be very stable. It is known that gamma-lactones can react with alcohols, in the presence of an acid, to afford gamma-hydroxy esters. However, the treatment of gamma-lactones with organic hydroperoxides under various experimental conditions does not break the five-membered heterocyclic ring. If a gamma-lactone bears a functional group, such as keto group, aldehyde group, and carbon-carbon double bond, a hydroperoxide can react with this group to form the corresponding peroxy derivative while the gamma-lactone ring remains unchanged. Many descriptions about different perketals appear in the chemical literature. However no perketal containing a gamma-lactone ring has previously been reported. Surprisingly it was found that the presence of a gamma-lactone ring in the molecule of a peroxide improved the catalytic behavior of the latter. Peroxides of this invention have excellent catalytic efficiency as polymerization initiators of compounds of vinyl type and as cross-linking agents for polyolefins.

It is therefore an object of this invention to provide novel peroxides which are highly efficient polymerization initiators and cross-linking agents.

Another object of the present invention is to provide highly efficient methods for synthesizing these useful peroxides.

It is another object of this invention to produce organic peroxides by reacting gamma-lactones containing a functional group with monohydroperoxides.

It is still another object of this invention to obtain perketals bearing a gamma-lactone ring by reactions of acyl-substituted gamma-lactones with monohydroperoxides A further object of the present invention is to obtain perketals containing a gamma-lactone ring from alpha-acyl-gamma-lactones reacted with monohydroperoxides.

A still further object of this invention is to produce perketals bearing a gamma-lactone ring by reacting alpha-acetyl-gamma-lactones with monohydroperoxides.

Another object of this invention is to obtain perketals bearing a gamma-lactone ring by reactions of alpha-acetyl-gamma-butyrolactone and alpha-acetyl-gamma-methyl-gamma-butyrolactone, with monohydroperoxides.

These and other objects and advantages of the present invention will be more apparent from the following detailed descriptions.

It has been found that these objects can be achieved by reacting alpha-acetyl-gamma-lactones with monohydroperoxides, with or without using a solvent, in the presence of an acid catalyst. The alpha-actyl-gamma-lactones used in this invention may be represented by the following general formula,

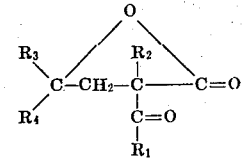

wherein $R_1$, $R_2$, $R_3$ and $R_4$ are as previously indicated in the structural formula of the peroxides. The alpha-acetyl-gamma-lactones used in this invention include alpha-acetyl-gamma-butyrolactone and alpha-acetyl-alpha-methyl-gamma-butyrolactone.

The monohydroperoxides used for the reactions of this invention may be represented by the following general formula,

wherein R is as previously indicated in the structural formula of the peroxides. The group of R radicals of these monohydroperoxides includes: t-butyl, t-amyl, 1,1,3,3-tetramethylbutyl, cumyl, p-methylcumyl, o-methylcumyl, p-isopropylcumyl, o-isopropylcumyl, p-n-butylcumyl, o-n-butylcumyl, p-sec-butylcumyl, o-sec-butylcumyl, p-t-butylcumyl, o-t-butylcumyl, p-chlorocumyl, o-chlorocumyl, p-bromocumyl, o-bromocumyl, p-ntrocumyl, o-nitrocumyl, p-carboxycumyl, alpha-ethyl-alpha-methyl-benzyl, phenylcyclohexyl, alpha-ethyl-alpha-methyl-m,m-di-sec-butyl-benzyl, m,m-dicyclohexylphenylcyclohexyl, 1,4,4-triethyl-1,2,3,4-tetrahydronaphthyl, 1,4,4-triisopropyl-1,2,3,4-tetrahydronaphthyl, 1,4,4-tri-sec-butyl-1,2,3,4-tetrahydronaphthyl, 1,4,4-tri-t-butyl-1,2,3,4-tetrahydronaphthyl, 1,4,4-tri-t-amyl-1,2,3,4-tetrahydronaphthyl, 1,3,3-trimethylindanyl, tri-phenylmethyl, 1-pinanyl, and the like.

Alpha-acyl-gamma-lactones are beta-keto cyclic esters. When treated with hydroperoxides, in the presence of an acid, beta-keto esters can easily be converted to perketals. It was found that the time required for the reaction between an alpha-acyl-gamma-lactone and a hydroperoxide is extremely short. This may be partly due to the presence of the stable gamma-lactone ring which furnishes a driving force for the formation of a certain intermediate and consequently for the formation of the final product.

The acid-catalyzed reaction appears to involve the formation of carbonium ions and attacks of hydroperoxide on the carbonium ions. Some of the probable reactions mechanisms may be illustrated as follows.

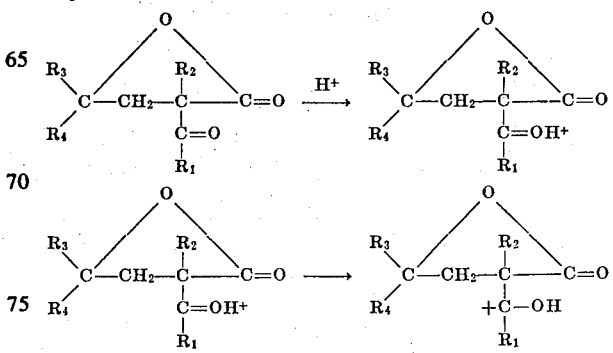

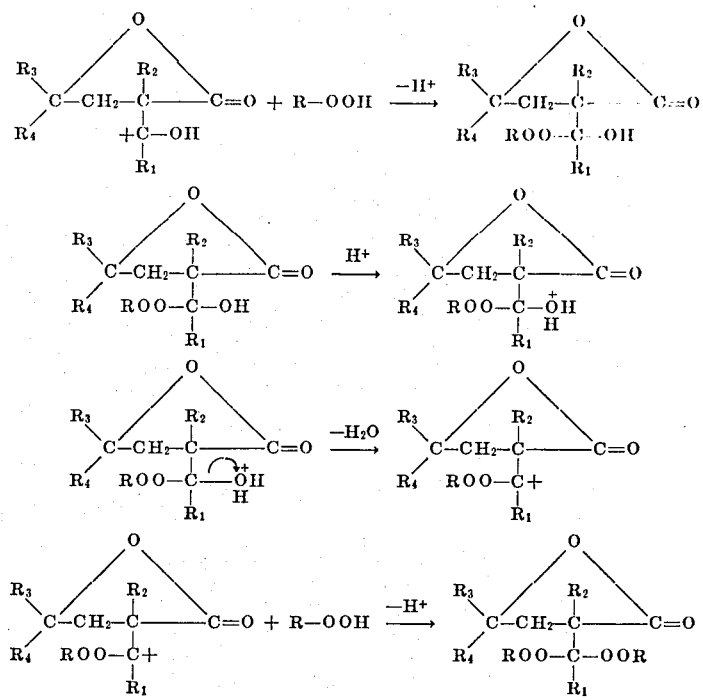

wherein R, $R_1$, $R_2$, $R_3$ and $R_4$ are as previously indicated.

Since a molecule of the product contains two peroxide groups the mole ratio of alpha-acyl-gamma-lactone to monohydroperoxide is in the order of 1:2. If the mole ratio is larger than this value the perketalization reaction will not be completed, and, consequently, some hemiperketal will be present in the final product. The mole ratio may vary from about 1:2 to about 1:4, but should not be greater than 1:2. The preferred mole ratio of alpha-acyl-gamma-lactone to monohydroperoxide is from about 1:2 to about 1:2.2.

Although the reactions of this invention can take place at a temperature ranging from about −10° C. to about 100° C. the preferred raction temperature is from 10° to 30° C., on account of the outstanding results obtained therefrom.

In the present invention, the acid catalyst for the reactions between alpha-acyl-gamma-lactones and monohydroperoxides may be sulfuric acid, hydrochloric acid, perchloric acid, phosphoric acid, benzenesulfonic acids, toluenesulfonic acids, trifluoromethanesulfonic acid, and the like. The quantity of the acidic catalyst used for the reaction may widely vary from a small trace to about 30 percent, based upon the total weight of the reactants. The preferred quantity of the acidic catalyst ranges from about 3 percent to about 15 percent, based upon the total weight of the reactants.

The time required for the reactions of this invention depends upon experimental conditions, for example, reaction temperature, the amount of catalyst, and the medium in which reactions occur. In general, the reactions need a relatively short period of time. It was found that long reaction time, for example, 3 or 4 hours at about 25° C. could decrease the yield of the final product. The preferred reaction time at about 25° C. is about 30 minutes.

The reactions of this invention may take place in an inert solvent, for example, benzene, toluene, pentane, hexane, heptane, etc., or without using a solvent. Since the products are to be solids the use of a solvent is preferred because the reaction mixture remains liquid.

These novel peroxides are excellent cross-linking agents for polyolefins. They also provide excellent polymerization initiators for styrene, vinyl esters, vinyl halides, alkyl methacrylates, unsaturated polyesters, and the like.

Representative reactions are illustrated by the following equations.

EQUATION (1)

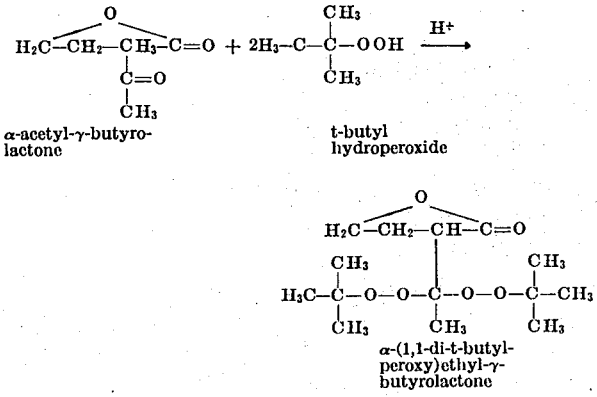

EQUATION (2)

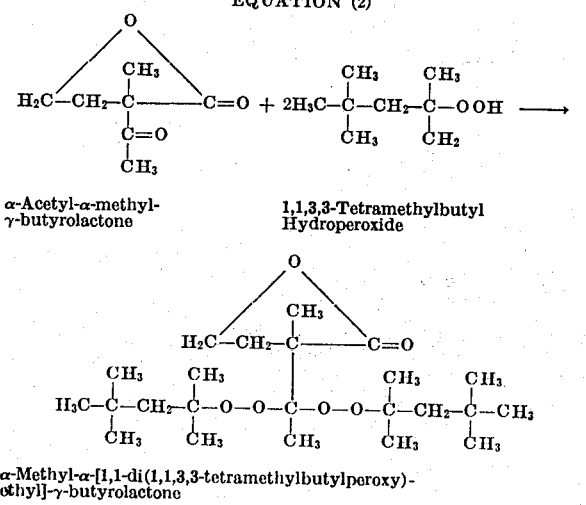

EQUATION (3)

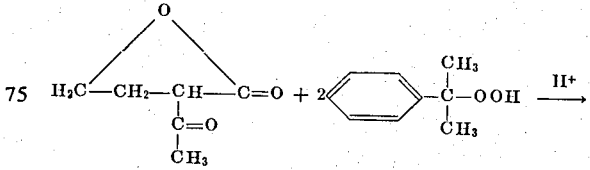

Cumene hydroperoxide

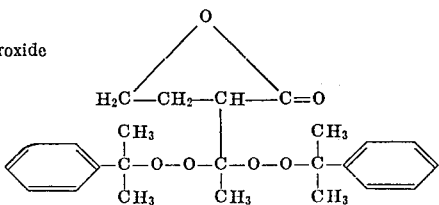

α-(1,1-dicumylperoxy)-ethyl-γ-butyrolactone

EQUATION (4)

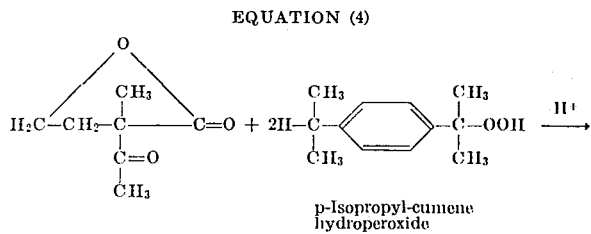

p-Isopropyl-cumene hydroperoxide

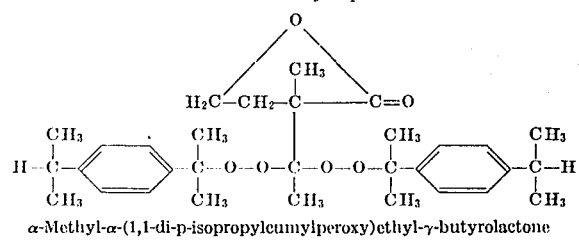

α-Methyl-α-(1,1-di-p-isopropylcumylperoxy)ethyl-γ-butyrolactone

EQUATION (5)

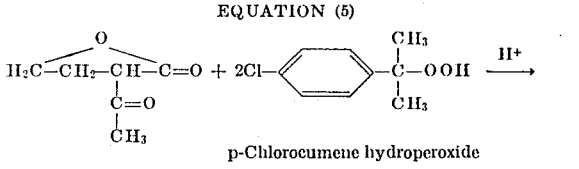

p-Chlorocumene hydroperoxide

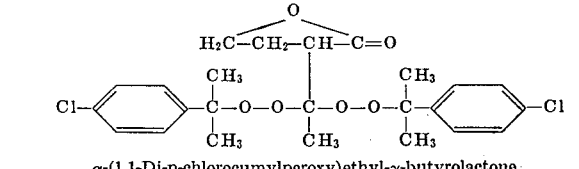

α-(1,1-Di-p-chlorocumylperoxy)ethyl-γ-butyrolactone

EQUATION (6)

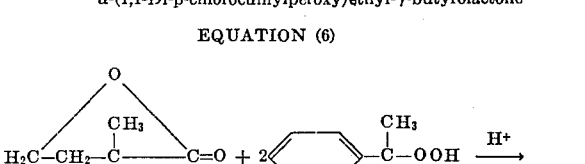

α-Ethyl-α-methylbenzyl hydroperoxide

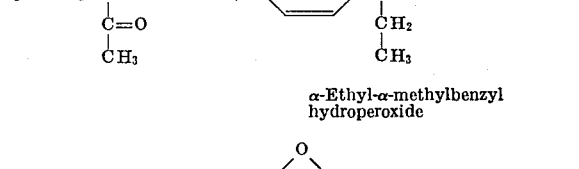

α-Methyl-α-[1,1-di(α-ethyl-α-methylbenzylperoxy)-ethyl]-γ-butyrolactone

EQUATION (7)

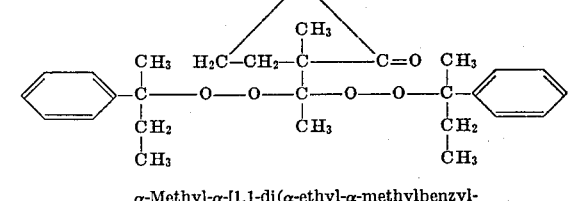

Phenylcyclohexyl hydroperoxide

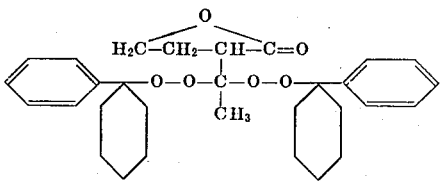

α-(1,1-diphenylcyclohexylperoxy)ethyl-γ-butyrolactone

EQUATION (8)

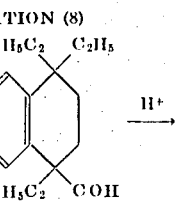

1,4,4-triethyl-1,2,3,4-tetrahydronaphthyl hydroperoxide

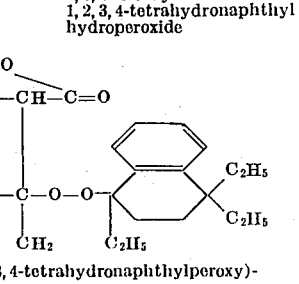

α-[1,1-di(1,4,4-triethyl-1,2,3,4-tetrahydronaphthylperoxy)-ethyl]-γ-butyrolactone

EQUATION (9)

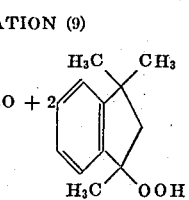

1,3,3-trimethylindane-1-hydroperoxide

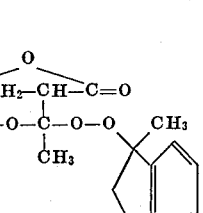

α-[1,1-di(1,3,3-trimethylindanylperoxy)ethyl]-γ-butyrolactone

EQUATION (10)

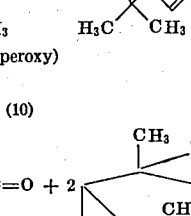

1-pinanyl hydroperoxide

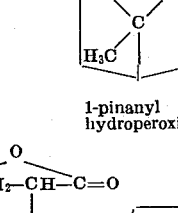

α-[1,1-di(1-pinanylperoxy)ethyl]-γ-butyrolactone

The following examples are given for the purposes of illustrating the present invention and are not deemed to be limitative hereto.

EXAMPLE 1

Preparation of Alpha-(1,1-Di-t-butylperoxy)ethyl-gamma-butyrolactone

To a mixture of 12.81 g. (0.10 mole) of alpha-acetyl-gamma butyrolactone and 18.94 g. (0.20 mole) of 95 percent t-butyl hydroperoxide was slowly added 7.00 g. (0.05 mole) of 70 percent sulfuric acid at 15°–20° C. with agitation. The reaction mixture was stirred at 15°–20° C. for about 35 to 40 minutes. During the stirring, a colorless crystalline solid was formed in the mixture. The solid was separated by filtration and dissolved in 200 ml. of diethyl ether. The ether solution was washed three times with 60-ml. portions of saturated sodium bicarbonate solution and twice with 50-ml. portions of water. Finally, it was dried over anhydrous magnesium sulfate. Filtration and removal of diethyl ether and low-boiling materials under reduced pressure using a water aspirator and a rotating evaporator left a colorless, fine, crystalline solid, weighing 25.00 g., indicating an 86.2 percent yield based upon the quantity of alpha-acetyl-gamma-butyrolactone used for the reaction, melted at 65°–67° C. The crude product did not react with the mixture of potassium iodide and acetic acid and contained 10.65 percent active oxygen as determined by the hydriodic acid-potassium thiosulfate method. After purification by crystallization from dilute ethyl alcohol, the solid product melted at 74° C. and had an 11.51 percent active oxygen content as compared with the theoretical value 11.02 percent.

Analysis - Calcd. for $C_{14}H_{26}O_6$: C, 57.91; H, 9.03; O, 33.06;
Molecular weight, 290.4
Found: C, 57.88; H, 8.97; O, 33.28;
Molecular weight, 286

The infrared spectrum of this compound in about a 15 percent solution in methylene chloride showed a strong band at 2,970 $cm^{-1}$ with a shoulder at 2,925 $cm^{-1}$ due to $CH_3$ and $CH_2$ groups, respectively; a very strong band at 1,760 $cm^{-1}$ due to the gamma-lactone ring; a medium band at 1,440 $cm^{-1}$ due to $CH_2$ and $C—CH_3$ groups; a strong band at 1,350 $cm^{-1}$ with a shoulder at 1,370 $cm^{-1}$ due to $C(CH_3)_3$ groups; a broad strong band showing peaks at 1,180 $cm^{-1}$, 1,160 $cm^{-1}$, 1,120 $cm^{-1}$, 1,100 $cm^{-1}$ and 1,020 $cm^{-1}$ indicating the C—O— linkages; and a medium band at 860 $cm^{-1}$ representing peroxide groups.

On the basis of these data, the product was assigned the structural formula as shown in Equation (1).

EXAMPLE 2

Preparation of alpha-Methyl-alpha-(1,1-di-t-butylperoxy)ethyl-gamma-butyrolactone To a mixture of 20.00 g. (0.20 mole) of 90 percent pure t-butyl hydroperoxide and 7.00 g. (0.05 mole) of 70 percent sulfuric acid was slowly added 14.22 g. (0.10 mole) of alpha-actyl-alpha-methyl-gamma-butyrolactone at 15°–20° C. with agitation. The reaction mixture was stirred at 15°–20° C. for about 40 minutes. A colorless crystalline solid was formed in the mixture during the stirring. The solid was separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. After filtration and removal of diethyl ether and low-boiling materials under reduced pressure using a water aspirator and a rotating evaporator, a colorless, fine, crystalline solid was obtained, weighing 25.90 g., indicating an 85.0 percent yield, based upon the quantity of alpha-acetyl-alpha-methyl-gamma-butyrolactone employed for the reaction. The product was purified by crystallizations from dilute ethyl alcohol. The purified product melted at 91°–92° C. and contained 10.93 percent active oxygen as determined by the hydriodic acid - sodium thiosulfate method as compared with the theoretical value 10.51 percent.

Analysis - Calcd. for $C_{15}H_{28}O_6$: C, 59.19; H, 9.27; O, 31.54;
Molecular weight, 304.
Found: C, 59.23; H, 9.14; O, 31.48;
Molecular weight, 295

The infrared spectrum of this compound in about a 15 percent solution in methylene chloride indicated a strong band at 2,975 $cm^{-1}$ with a shoulder at 2,930 $cm^{-1}$ representing $CH_3$ and $CH_2$ groups, respectively; a strong band at 1,750 $cm^{-1}$ due to the gamma-lactone carbonyl group; a medium at 1,440 $cm^{-1}$ due to $CH_2$ and $C—CH_3$ groups; a strong band at 1350 $cm^{-1}$ with a shoulder at 1,370 $cm^{-1}$ due to $C(CH_3)_3$ groups; a very strong and broad band with peaks at 1,180 $cm^{-1}$, 1,120 $cm^{-1}$, 1,100 $cm^{-1}$, 1,060 $cm^{-1}$ and 1020 $cm^{-1}$ indicating the C—O— linkages; a medium band at 850 $cm^{-1}$ due to peroxide groups.

On the basis of these data, the structure of this compound is assigned as shown below.

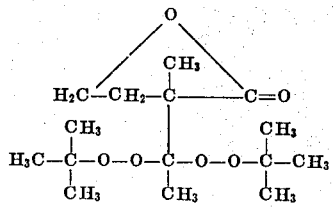

EXAMPLE 3

Preparation of Alpha-(1,1-Di-t-amylperoxy)ethyl-gamma-butyrol-actone

To a mixture of 25.52 g. (0.22 mole) of 90 percent pure t-amyl hydroperoxide and 7.00 g. (0.05 mole) of 70 sulfuric acid was slowly added 12.81 g. (0.10 mole) of alpha-acetyl-gamma-butyrolactone at 15°–20° C. with agitation. The reaction mixture was stirred at 15°–20° C. for 40 minutes. A solid product was formed and subsequently separated by filtration and dissolved in 150 ml. of diethyl ether. The ether solution was washed twice with 50-ml. portions of saturated sodium bicarbonate solution and once with 50 ml. of water, and dried over anhydrous magnesium sulfate. After filtration and removal of diethyl ether and low-boiling materials under reduced pressure, a fine, colorless, crystalline solid was obtained in an 85.0 percent yield, based upon the amount of alpha-acetyl-gamma-butyrolactone used for the reaction. The solid product was purified by crystallizations from dilute ethyl alcohol and identified as a perketal bearing a gamma-butyrolactone ring, represented by the following structure.

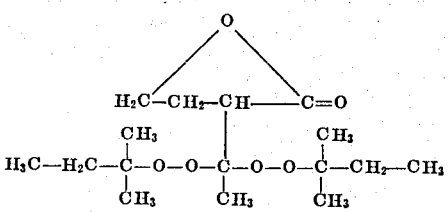

EXAMPLE 4

Preparation of Alpha-methyl-alpha-(1,1-di-t-amylperoxyl-ethyl-gamma-butyrolactone To a mixture of 25.52 g. (0.22 mole) of 90 percent pure t-amyl hydroperoxide and 7.00 g. (0.05 mole) of 70 percent sulfuric acid was slowly added 14.22 g. (0.10 mole) of alpha-actyl-alpha-methyl-gamma-butyrolactone at 15°–20° C. with agitation. The reaction mixture was stirred at 15°–20° C. for 40 minutes. A solid product was formed and subsequently separated by filtration, and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of diethyl ether and low-boiling materials under reduced pressure left a fine, colorless, crystalline solid product, in an 85.0 percent yield, based upon the quantity of alpha-acetyl-alpha-methyl-gamma-butyrolactone used for the reaction. The product was purified by crystallization and identified as a perketal bearing a gamma-butyrolactone ring, having the following structure.

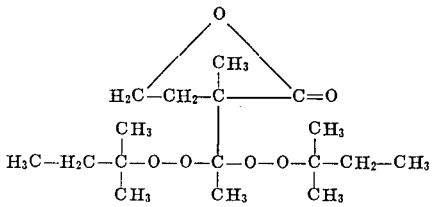

EXAMPLE 5

Preparation of Alpha-[1,1-Di(1,1,3,3-tetramethylbutylperoxy)-ethyl]-gamma-butyrolactone To a mixture of 32.12 g. (0.22 mole) of 1,1,3,3-tetramethylbutyl hydroperoxide and 7.00 g. (0.05 mole) of 70 percent sulfuric acid was slowly added 12.81 g. (0.10 mole) of alpha-acetyl-gamma-butyrolactone at 15°–20° C. with agitation. The reaction mixture was stirred at 15°–20° C. for 40 minutes. A solid product was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. After filtration and removal of diethyl ether and low-boiling materials under reduced pressure, a fine, crystalline solid product was obtained, in an 85.0 percent yield, based upon the amount of alpha-acetyl-gamma-butyrolactone used for the reaction. It was purified by crystallizations from delute ethyl alcohol and identified as a perketal containing a gamma-butyrolactone ring, represented by the following structure.

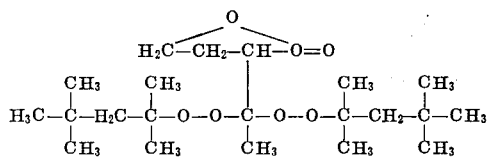

EXAMPLE 6

Preparation of Alpha-methyl-alpha-[1,1-di(1,1,3,3-tetramethyl-butylperoxy)ethyl]-gamma-butyrolactone To a mixture of 32.12 g. (0.22 mole) of 1,1,3,3-tetramethyl-butyl hydroperoxide and 7.00 g. (0.05 mole) of 70 percent sulfuric acid was slowly added 14.22 g. (0.10 mole) of alpha-acetyl-alpha-methyl-gamma-butyrolacetone at 15°–20° C. with agitation. The reaction mixture was stirred at 15°–20° C. for 40 minutes. A solid product was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of diethyl ether and low-boiling materials under reduced pressure left a solid product, in an 85.0 percent yield, based upon the amount of alpha-acetyl-alpha-methyl-gamma-butyrolactone used for the reaction. The product was purified by crystallizations from dilute ethyl alcohol and identified as a perketal bearing a gamma-butyrolacetone ring, represented by the structure as shown in Equation (2).

EXAMPLE 7

Preparation of Alpha-(1,1-Dicumylperoxy)ethyl-gamma-butyrolactone

To a mixture of 33.44 g. (0.22 mole) of cumene hydroperoxide and 7.00 g. (0.05 mole) of 70 percent sulfuric acid was added 12.81 g. (0.10 mole) of alpha-acetyl-gamma-butyrolactone at 15°–20° C. with agitation. The reaction mixture was formed and subsequently stirred at 15°–20° C. for 40 minutes. A solid was separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. After filtration and removal of diethyl ether and low-boiling materials under reduced pressure, a solid product was obtained, in an 85.0 percent yield, based upon the amount of alpha-acetyl-gamma-butyrolactone employed for the reaction. It was purified by crystallizations from dilute ethyl alcohol and identified as a perketal bearing a gamma-lactone ring, having the structure as shown in Equation (3).

EXAMPLE 8

Preparation of Alpha-methyl-alpha-(1,1-dicumylperoxy)ethyl-gamma-butyrolactone

To a mixture of 33.44 g. (0.22 mole) of cumene hydroperoxide and 7.00 g. (0.05 mole) of 70 percent sulfuric acid was slowly added 14.22 g. (0.10 mole) of alpha-acetyl-alpha-methyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of the solvent and low-boiling materials under reduced pressure left a solid product in an 85.0 percent yield based on the quantity of alpha-acetyl-alpha-methyl-gamma-butyrolactone used for the reaction. It was purified by crystallizations from dilute ethyl alcohol and identified as the peroxide having the following structure.

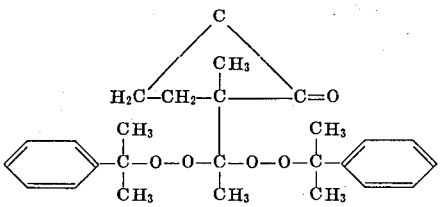

EXAMPLE 9

Preparation of Alpha-(1,1Di-p-chlorocumylperoxy)ethyl-gamma-butyrolactone

To a mixture of 41.04 g. (0.22 mole) of p-chlorocumene hydroperoxide and 7.00 g. (0.05 mole) of 70 percent sulfuric acid was added 12.81 g. (0.10 mole) of alpha-acetyl-gamma-butyrolacetone at 15°–20° C. with agitation. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of diethyl ether and low-boiling materials under reduced pressure give a solid product, in about 85.0 percent yield based upon the amount of alpha-acetyl-gamma-butyrolactone used for the reaction. After purification by crystallization from dilute ethyl alcohol, the product was identified as a perketal represented by the structure as shown in Equation (5).

EXAMPLE 10

Preparation of Alpha-methyl-alpha-(1,1-di-o-chlorocumylperoxy)-ethyl-gamma-butyrolactone To a mixture of 41.04 g. (0.22 mole) of o-chlorocumene hydroperoxide and 7.00 g. (0.05 mole) of 70 percent sulfuric acid was added 14.22 g. (0.10 mole) of alpha-acetyl-alpha-methyl-gamma-butyrolactone at 15°–20° C. with agitation. The reaction mixture was stirred at 15°–20° C. for 40 minutes. A solid was formed and subsequently separated by filtration, and dissolved in 150 ml. of diethyl ether. The ether solution was washed twice with 50-ml. portions of saturated sodium bicarbonate solution and once with 50 ml. of water, and then dried over anhydrous magnesium sulfate. Filtration and removal of ether and low-boiling materials under reduced pressure left a solid product, in 85.0 percent yield, based upon the quantity of alpha-acetyl-alpha-methyl-gamma-butyrolactone used for the reaction. It was purified by crystallization from dilute ethyl alcohol and identified as the peroxide having the structure as shown below.

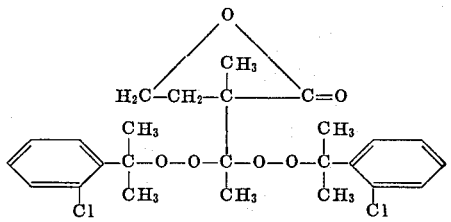

EXAMPLE 11

Preparation of Alpha-(1,1,-Di-p-methylcumylperoxy)ethyl-gamma-butyrolactone

To a mixture of 36.52 g. (0.22 mole) of p-methylcumene hydroperoxide and 7.00 g. (0.05 mole) of 70 percent sulfuric acid was added 12.81 g. (0.10 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The resulting solution was washed twice with 50-ml. portions of saturated sodium bicarbonate solution and once with 50 ml. of water, and finally dried over anhydrous magnesium sulfate. Filtration and removal of solvent and low-boiling materials under reduced pressure gave a solid product, in 85.0 percent yield, based upon the amount of alpha-acetyl-gamma-butyrolactone used for the reaction. The product was purified by crystallizations from dilute ethyl alcohol and identified as the peroxide having the following structure.

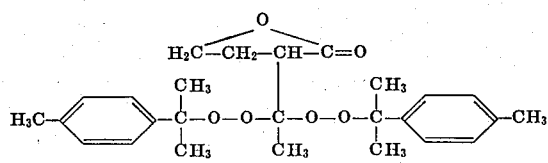

EXAMPLE 12

Preparation of Alpha-methyl-alpha-(1,1-di-o-methylcumyl-peroxy)-ethyl-gamma-butyrolactone To a mixture of 36.52 g. (0.22 mole) of o-methylcumene hydroperoxide and 7.00 g. (0.05 mole) of 70 percent sulfuric acid was added 14.22 g. (0.10 mole) of alpha-acetyl-alpha-methyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The resulting solution was washed twice with 50-ml. portions of saturated sodium bicarbonate solution and once with 50 ml. of water, and then dried over anhydrous magnesium sulfate. Filtration and removal of the solvent and low-boiling materials under reduced pressure gave a solid product, in 85.0 percent yield, based upon the amount of alpha-acetyl-alpha-methyl-gamma-butyrolactone used for the reaction. It was purified by crystallizations from dilute ethyl alcohol and identified as the peroxide represented by the following structure.

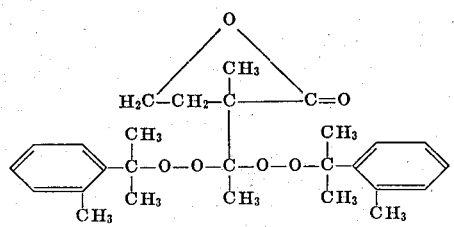

EXAMPLE 13

Preparation of Alpha-(1,1-Di-p-isopropylcumylperoxy)ethyl-gamma-butyrolactone

To a mixture of 42.68 g. (0.22 mole) of p-isopropyl-cumene hydroperoxide and 7.00 g. (0.05 mole) of 70 percent sulfuric acid was added 12.81 g. (0.10 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The resulting solution was washed twice with 50-ml. portions of saturated sodium bicarbonate solution and once with 50 ml. of water and then dried over anhydrous magnesium sulfate. Filtration and removal of the solvent and low-boiling materials under reduced pressure left a solid product, in an 85.0 percent yield, based upon the amount of alpha-acetyl-gamma-butyrolactone used for the reaction. The product was purified by crystallizations from dilute ethyl alcohol and identified as the peroxide having the structure as shown in Equation (4).

EXAMPLE 14

Preparation of Alpha-Methyl-Alpha-(1,1-di-p-t-butylcumyl-peroxy)-ethyl-gamma-butyrolactone To a mixture of 44.88 g. (0.22 mole) of p-t-butylcumene hydroperoxide and 7.00 g. (0.05 mole) of 70 percent sulfuric acid was added 12.81. g. (0.10 mole) of alpha-acetyl-alpha-methyl-gamma-butyrolactone at 15°–20° C. with agitation. The reaction mixture was stirred at 15°–20° C. for 40 minutes. A solid product was formed and subsequently separated by filtration and dissolved in 150 ml. of diethyl ether. The resulting solution was washed twice with 50-ml. portions of saturated sodium bicarbonate solution and once with 50 ml. of water, and then dried over anhydrous magnesium sulfate. Filtration and removal of the solvent and low-boiling materials under reduced pressure left a solid product, in an 85.0 percent yield, based upon the quantity of alpha-acetyl-alpha-methyl-gamma-butyrolactone employed for the reaction. After purification by crystallizations from dilute ethyl alcohol, the solid product was identified as a peroxide having the following structure.

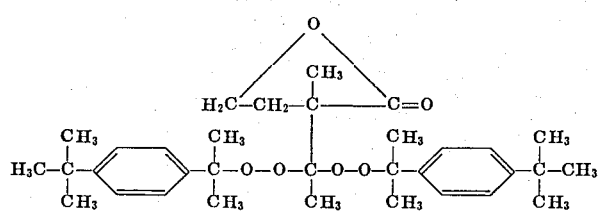

EXAMPLE 15

Preparation of Alpha-[1,1-Di(alpha-ethyl-alpha-methyl-benzyl-peroxy)ethyl]-gamma-butyrolactone To a mixture of 36.52 g. (0.22 mole) of alpha-ethyl-alpha-methylbenzyl hydroperoxide an 7.00 g. (0.05 mole) of 70 percent sulfuric acid was added 12.81 g. (0.10 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of the solvent and low-boiling materials under reduced pressure gave a solid product, in an 85.0 percent yield, based upon the amount of alpha-acetyl-gamma-butyrolactone employed for the reaction. It was purified by crystallization from dilute ethyl alcohol and identified as the peroxide represented by the following structure.

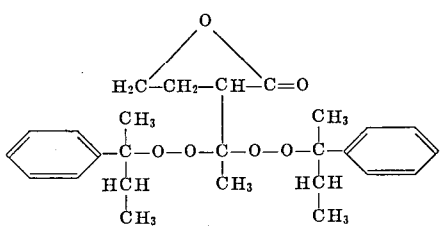

EXAMPLE 16

Preparation of Alpha-methyl-alpha-[1,1-di(alpha-ethyl-alpha-methylbenzyl-peroxy)ethyl]-gamma-butyrolactone To a mixture of 36.52 g. (0.22) mole of alpha-ethyl-alpha-methylbenzyl hydroperoxide and 7.00 g. (0.05 mole) of 70 percent sulfuric acid was added 14.22 g. (0.22 mole) of alpha-acetyl-alpha-methyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The resulting solution was washed twice with 50-ml. portions of saturated sodium bicarbonate solution and once with 50 ml. of water, and then dried over anhydrous magnesium sulfate. Filtration and removal of ether and low-boiling materials under reduced pressure left a solid product, in an 85.0 percent yield, based upon the amount of alpha-acetyl-alpha-methyl-gamma-butyrolactone used for the reaction. It was purified by crystallization from dilute ethyl alcohol and identified as the peroxide having the structure as indicated in Equation (6).

EXAMPLE 17

Preparation of Alpha-(1,1-Diphenylcyclohexylperoxy)ethyl-gamma-butyrolactone

To a mixture of 42.24 g. (0.22 mole) of phenylcyclohexyl hydroperoxide and 7.00 g. (0.05 mole) of 70 percent sulfuric acid was added 12.81 g. (0.10 mole) of alpha-acetyl-gamma-butyrolactone at 15°–20° C. with stirring. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution at once with 50 ml. of water, and then dried over anhydrous magnesium sulfate. Filtration and removal of ether and low-boiling materials under reduced pressure left a solid product, in an 85.0 percent yield, based upon the amount of alpha-acetyl-gamma-butyrolactone used for the reaction. It was purified by crystallization from dilute ethyl alcohol and identified as the peroxide having the structure as shown in Equation (7).

EXAMPLE 18

Preparation of Alpha-[1,1-Di(1,4,4-triethyl-1,2,3,4-tetrahydro-naphthylperoxy)ethyl]-gamma-butyrolactone To a mixture of 27.28 g. (0.11 mole) of 1,4,4-triethyl-1,2,3,4-tetrahydronaphthyl hydroperoxide and 4.20 g. (0.03 mole) of 70 percent sulfuric acid was added 6.42 g. (0.05 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of ether and low-boiling materials under reduced pressure left a solid product, in an 85.0 percent yield, based upon the amount of alpha-acetyl-gamma-butyrolactone used for the reaction. It was purified by crystallizations from dilute ethyl alcohol and identified as the peroxide having the structure as shown in Equation (8).

EXAMPLE 19

Preparation of Alpha-[1,1,-Di(1,3,3-trimethylindanylperoxy)-ethyl]-gamma-butyrolactone To a mixture of 21.12 g. (0.11 mole) of 1,3,3-trimethyl-indane-1-hydroperoxide and 4.20 g. (0.03 mole) of 70% sulfuric acid was added 6.42 g. (0.05 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The resulting solution was washed twice with 50-ml. portions of saturated sodium bicarbonate solution and once with 50 ml. of water, and then dried over anhydrous magnesium sulfate. Filtration and removal of ether and low-boiling materials under reduced pressure left a solid product, in an 85.0 percent yield, based on the amount of alpha-acetyl-gamma-butyrolactone used for the reaction. It was purified by crystallization from dilute ethyl alcohol and identified as the peroxide represented by the structure as shown in Equation (9).

EXAMPLE 20

Preparation of Alpha-[1,1-Di(1-pinanylperoxy)ethyl]-gamma-butyrolactone

To a mixture of 17.03 g. (0.10 mole) of 1-pinanyl hydroperoxide and 4.20 g. (0.03 mole) of 70% sulfuric acid was added 6.42 g. (0.05 mole) of alpha-acetyl-gamma-butyrolactone at 15°–20° C. with agitation. The reaction mixture was stirred at 15°–20° C. for 40 minutes. A solid was formed and subsequently separated by filtration and dissolved in 150 ml. of diethyl ether. The ether solution was washed twice with 50-ml. portions of saturated sodium bicarbonate solution and once with 50 ml. of water, and finally dried over anhydrous magnesium sulfate. Filtration and removal of ether and low-boiling materials under reduced pressure gave a solid product, in an 85.0 percent yield, based upon the quantity of alpha-acetyl-gamma-butyrolactone used for the reaction. It was purified by crystallizations from dilute ethyl alcohol and identified as the peroxide having the structure as indicated in Equation (10).

EXAMPLE 21

Preparation of Alpha-(1,1-di-t-butylperoxy) ethyl-gamma-butyrolactone

Example 1 was repeated except that the acid catalyst used was 8.6 grams of 37 percent hydrochloric acid. The yield was about 73 percent based upon the quantity of alpha-acetyl-gamma-butyrolactone used for the reaction.

EXAMPLE 22

Preparation of Alpha-(1,1,-di-t-butylperoxy) ethyl-gamma-butyrolactone

Example 1 was repeated except that the acid catalyst used was 4.53 grams of 70 percent perchloric acid. The yield was about 81 percent upon the quantity of alpha-acetyl-gamma-butyrolactone used for the reaction.

EXAMPLE 23

Preparation of Alpha-(1,1-di-t-butylperoxy) ethyl-gamma-butyrolactone

Example 1 was repeated except that the acid catalyst used was 3.73 grams of 85 percent phosphoric acid. The yield was about 75 percent based upon the quantity of alpha-acetyl-gamma-butyrolactone used for the reaction.

EXAMPLE 24

Preparation of Alpha-(1,1-di-t-butylperoxy) ethyl-gamma-butyrolactone

Example 1 was repeated except that the acid catalyst used was 3.20 grams of benzenesulfonic acid. The yield was about 73 percent based upon the quantity of alpha-acetyl-gamma-butyrolactone used for the reaction.

EXAMPLE 25

Preparation of Alpha-(1,1-di-t-butylperoxy) ethyl-gamma-butyrolactone

Example 1 was repeated except that the acid catalyst used was 3.20 grams of P-toluenesulfonic acid. The yield was about 75 percent based upon the quantity of alpha-acetyl-gamma-butyrolactone used for the reaction.

EXAMPLE 26

Preparation of Alpha-(1,1-di-t-butylperoxy) ethyl-gamma-butyrolactone

Example 1 was repeated except that the acid catalyst used was 3.20 grams of trifluoromethanesulfonic acid. The yield was about 70 percent based upon the quantity of alpha-acetyl-gamma-butyrolactone used for the reaction.

What is claimed is:

1. An organic peroxide having the formula:

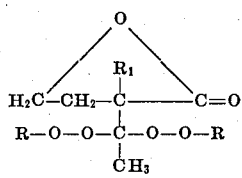

wherein: $R_1$ is a member of the group consisting of hydrogen and methyl and R is a member selected from the group consisting of butyl, amyl, tetramethylbutyl, cumyl, chlorocumyl, methyl-cumyl, isopropylcumyl, butylcumyl, alpha-ethyl-alpha-methyl-benzyl, phenylcyclohexyl, triethyl-tetrahydronaphthyl, trimethylindane, 1-pinanyl.

2. A method for producing an organic peroxide according to claim 1 comprising reacting (A) a gamma-lactone selected from the group consisting of alpha-acetyl-gamma-butyrolactone and alpha-acetyl-alpha-methyl-gamma-butyrolactone and (B) an organic monohydroperoxide at a mole ratio ranging from about 1:2 to about 1:4 in the presence of (C) an acid catalyst being at least one member selected from the group consisting of sulfuric, hydrochloric, perchloric, phosphoric, benzenesulfonic, toluenesulfonic and trifluoromethanesulfonic acids at a temperature ranging from about −10° C. to about 100° C. and wherein said monohydroperoxide has the general formula R — O — O — H wherein R is selected from the group consisting of butyl, amyl, tetramethylbutyl, cumyl, chlorocumyl, methyl-cumyl, isopropylcumyl, butylcumyl, alpha-ethyl-alpha-methyl-benzyl, phenylcyclohexyl, triethyl-tetrahydronaphthyl, trimethylindane, 1-pinanyl.

3. The method for making organic peroxides according to claim 2 wherein (A) is alpha-acetyl-gamma-butyrolactone.

4. The method for making organic peroxides according to claim 2 wherein (A) is alpha-acetyl-alpha-methyl-gamma-butyrolactone.

5. The method for making organic peroxides according to claim 2 wherein the mole ratio of (A) to (B) is from about 1:2.0 to about 1:2.2

6. The method for making organic peroxides according to claim 2 wherein the temperature ranges from about 10° C. to about 30° C.

* * * * *